US012700596B2

(12) United States Patent
Miyazaki

(10) Patent No.: US 12,700,596 B2
(45) Date of Patent: Aug. 4, 2026

(54) CATALYST FOR FUEL CELLS AND METHOD FOR PRODUCING SAME

(71) Applicant: CATALER CORPORATION, Kakegawa (JP)

(72) Inventor: Kosuke Miyazaki, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 599 days.

(21) Appl. No.: 18/039,592

(22) PCT Filed: Nov. 24, 2021

(86) PCT No.: PCT/JP2021/043053
§ 371 (c)(1),
(2) Date: May 31, 2023

(87) PCT Pub. No.: WO2022/124080
PCT Pub. Date: Jun. 16, 2022

(65) Prior Publication Data
US 2023/0420695 A1     Dec. 28, 2023

(30) Foreign Application Priority Data
Dec. 10, 2020     (JP) ................................. 2020-204840

(51) Int. Cl.
H01M 4/92     (2006.01)
H01M 4/88     (2006.01)
H01M 4/86     (2006.01)

(52) U.S. Cl.
CPC ........... H01M 4/926 (2013.01); H01M 4/885 (2013.01); H01M 4/921 (2013.01); *H01M 2004/8689* (2013.01)

(58) Field of Classification Search
CPC . H01M 2004/8689; H01M 2008/1095; H01M 4/88; H01M 4/885; H01M 4/921; H01M 4/926; Y02E 60/50
See application file for complete search history.

(56) References Cited

U.S. PATENT DOCUMENTS

2013/0244137 A1     9/2013   Tada et al.
2017/0200956 A1     7/2017   Nagami et al.
(Continued)

FOREIGN PATENT DOCUMENTS

JP          H08-084930 A     4/1996
JP          2003-142112 A    5/2003
(Continued)

OTHER PUBLICATIONS

Jan. 25, 2022 Search Report issued in International Patent Application No. PCT/JP2021/043053.
(Continued)

*Primary Examiner* — Victoria H Lynch
(74) *Attorney, Agent, or Firm* — Oliff PLC

(57)          ABSTRACT

A catalyst for fuel cells that contains a carbon powder carrier and catalyst particles carried on the carbon powder carrier, the catalyst particles being Pt alloy particles, the catalyst for fuel cells having 0.65 mmol/g or more of hydrophilic groups, and a Pt elution amount when 0.5 g of the catalyst for fuel cells is immersed in 30 ml of a 0.5 mol/L aqueous sulfuric acid solution and retained for 100 hours at room temperature under stirring being 0.625 mg or less per g of the catalyst for fuel cells.

16 Claims, 1 Drawing Sheet

(56) References Cited

U.S. PATENT DOCUMENTS

| | | | |
|---|---|---|---|
| 2017/0250432 A1* | 8/2017 | Takahashi | ............... H01M 4/92 |
| 2021/0143444 A1 | 5/2021 | Matsutani | |

FOREIGN PATENT DOCUMENTS

| | | |
|---|---|---|
| JP | 2011-003492 A | 1/2011 |
| JP | 2012-124001 A | 6/2012 |
| KR | 10-2017-0083486 | 7/2017 |
| WO | 2010/150058 A1 | 12/2010 |
| WO | 2018/194007 A1 | 10/2018 |

OTHER PUBLICATIONS

Jan. 25, 2022 Written Opinion issued in International Patent Application No. PCT/JP2021/043053.
Sugawara, Y. et al., "Formation of Pt Skin Layer on Ordered and Disordered Pt-Co Alloys and Corrosion Resistance in Sulfuric Acid," Electrocatalysis, 2018, vol. 9, pp. 539-549.

* cited by examiner

CATALYST FOR FUEL CELLS AND METHOD FOR PRODUCING SAME

FIELD

The present invention relates to a fuel cell catalyst and a method for the production thereof.

BACKGROUND

Fuel cells are promising as next-generation batteries. In particular, solid polymer electrolyte fuel cells have advantages such as low operating temperature, short start-up time, and compact size, and have been put to practical use in the field of power sources for driving automobiles.

Solid polymer fuel cells have a structure in which a cathode (air electrode), a solid polymer electrolyte membrane, and an anode (fuel electrode) are laminated in this order. In such solid polymer electrolyte fuel cells, when oxygen or air is supplied to the cathode and fuel such as hydrogen is supplied to the anode, an oxidation/reduction reaction occurs at each electrode, generating electric power.

In fuel cells, the electrodes contain a fuel cell catalyst for promoting the oxidation/reduction reaction described above. As the fuel cell catalyst, one having a structure in which catalyst particles are carried on a carbon powder carrier is widely used. Pt particles and Pt alloy particles are known as catalyst particles for fuel cell catalysts.

For example, Patent Literature 1 describes a method for the production of a Pt-carrying catalyst, wherein a Pt precursor compound is reduced in a liquid phase in the presence of carrier particles. Patent Literature 2 describes the use of Pt alloy particles as catalyst particles for improving the activity of a cathode of a solid polymer fuel cell.

Patent Literature 3 and 4 propose the introduction of hydrophilic groups into a carbon powder carrier carrying Pt in order to improve the activity (in particular, the initial activity) of a fuel cell catalyst. This introduction of hydrophilic groups is believed to be advantageous not only for improving the initial activity of the fuel cell catalyst, but also for maintaining catalyst performance when the fuel cell catalyst is in a low humidity state.

Patent Literature 5 reports that there is a relationship between the durability of a Pt-carrying catalyst and the elution property of Pt.

CITATION LIST

Patent Literature

[PTL 1] Japanese Unexamined Patent Publication (Kokai) No. 08-084930
[PTL 2] Japanese Unexamined Patent Publication (Kokai) No. 2003-142112
[PTL 3] Japanese Unexamined Patent Publication (Kokai) No. 2011-003492
[PTL 4] Japanese Unexamined Patent Publication (Kokai) No. 2012-124001
[PTL 5] WO 2018/194007

SUMMARY

Technical Problem

The present inventors have discovered that in a fuel cell catalyst using Pt alloy particles as catalyst particles, when hydrophilic groups are introduced into the fuel cell catalyst in accordance with the teachings of Patent Literature 3 and 4, Pt is eluted into the solvent used for electrode production, resulting in a phenomenon whereby catalyst activity is impaired. It is believed that this phenomenon has hindered the investigation of improvement in the activity of fuel cell catalysts using Pt alloy particles as catalyst particles.

An object of the present invention is to provide a fuel cell catalyst which achieves both improved catalyst activity and catalyst performance at low humidity when using Pt alloy particles as catalyst particles, and which maintains high catalyst activity for long periods of time, as well as a method for the production thereof.

Solution to Problem

The present invention is as described below.

<<Aspect 1>> A fuel cell catalyst, comprising a carbon powder carrier, and catalyst particles carried on the carbon powder carrier, wherein
   the catalyst particles are Pt alloy particles,
   the fuel cell catalyst has 0.65 mmol/g or more of hydrophilic groups, and
   when 0.5 g of the fuel cell catalyst is immersed in 30 mL of a 0.5 mol/L sulfuric acid solution and maintained at room temperature for 100 hours while stirring, an elution amount of Pt is 0.625 mg or less per gram of the fuel cell catalyst.

<<Aspect 2>> The fuel cell catalyst according to Aspect 1, wherein the hydrophilic groups are acidic groups.

<<Aspect 3>> The fuel cell catalyst according to Aspect 1 or 2, wherein the elution amount of Pt is 0.300 mg or less per gram of the fuel cell catalyst.

<<Aspect 4>> The fuel cell catalyst according to any one of Aspects 1 to 3, wherein the Pt alloy particles are alloy particles containing:
   Pt, and
   one or more metals selected from the group consisting of Ti, Cr, Mn, Fe, Co, Ni, Cu, Ga, Zr, Hf, Ru, Ir, Pd, Os, and Rh.

<<Aspect 5>> The fuel cell catalyst according to any one of Aspects 1 to 4, wherein an average particle size of the catalyst particles is 2 nm or more and 10 nm or less.

<<Aspect 6>> An electrode of a fuel cell, comprising the fuel cell catalyst according to any one of Aspects 1 to 5.

<<Aspect 7>> The electrode according to Aspect 6, wherein the electrode is a cathode.

<<Aspect 8>> A fuel cell, comprising the electrode according to Aspect 6 or 7.

<<Aspect 9>> A method for the production of the fuel cell catalyst according to any one of Aspects 1 to 5, the method comprising the steps of:
   carrying the catalyst particles on a carbon powder carrier to prepare a catalyst particle-carrying carbon powder;
   contacting the catalyst particle-carrying carbon powder with an oxidizing agent to impart hydrophilic groups to the catalyst particle-carrying carbon powder to prepare a fuel cell catalyst precursor; and
   contacting the fuel cell catalyst precursor with a reducing agent to prepare a fuel cell catalyst.

<<Aspect 10>> The method according to Aspect 9, wherein the oxidizing agent used in the contacting of the catalyst particle-carrying carbon powder is one or more oxidizing agents selected from the group consisting of sulfuric acid, nitric acid, phosphorous acid, potassium permanganate, hydrogen peroxide, chloric acid, and chromic acid.

<<Aspect 11>> The method according to Aspect 9 or 10, wherein the reducing agent used in the contacting of the fuel cell catalyst precursor is one or more reducing agents selected from the group consisting of alcohols, carboxylic acids, and aldehydes.

Advantageous Effects of Invention

According to the present invention, there can be provided a fuel cell catalyst which achieves both improved catalyst activity and catalyst performance at low humidity when using Pt alloy particles as catalyst particles, and which maintains high catalyst activity for long periods of time, as well as a method for the production thereof.

DESCRIPTION OF EMBODIMENTS

<<Fuel Cell Catalyst>

Figure 1:
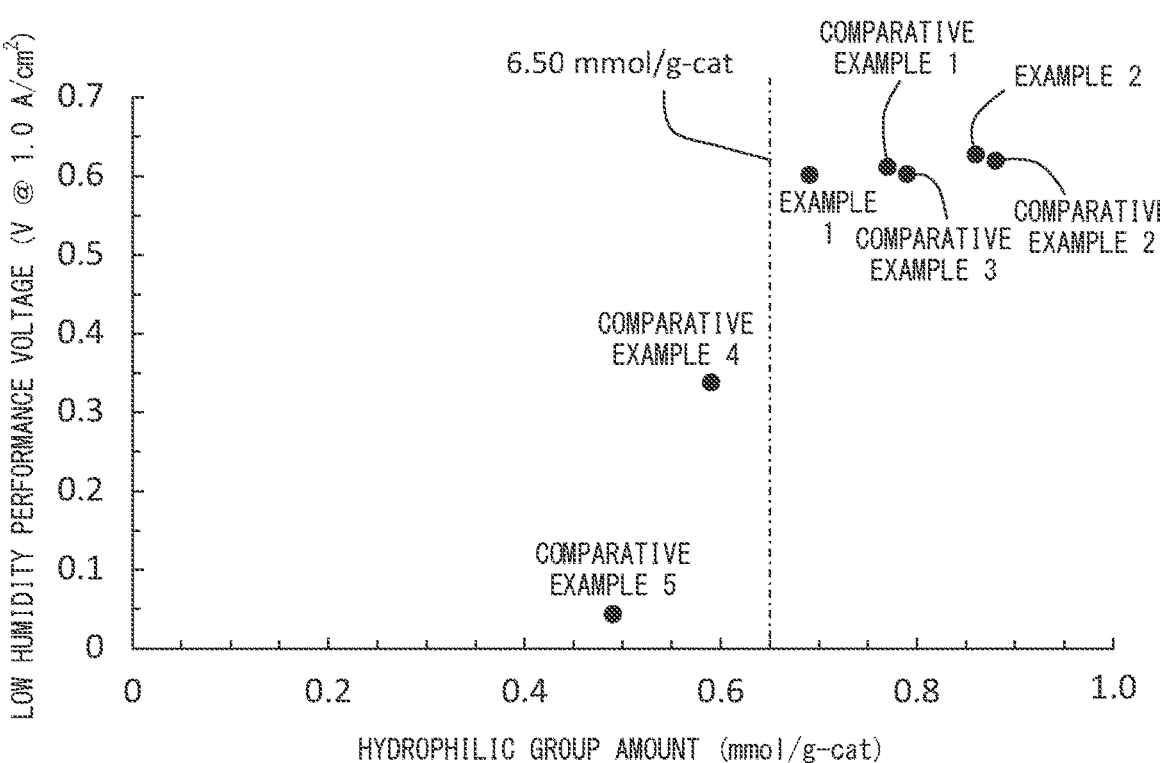
FIG. 1 is a graph showing the relationship between the hydrophilic group amount and catalyst performance at low humidity (low humidity performance voltage) of the catalyst particles obtained in the Examples and Comparative Examples.

The fuel cell catalyst of the present invention comprises a carbon powder carrier, and catalyst particles carried on the carbon powder carrier, wherein the catalyst particles are Pt alloy particles, the fuel cell catalyst has 0.65 mmol/g or more of hydrophilic groups, and when 0.5 g of the fuel cell catalyst is immersed in 30 mL of a 0.5 mol/L sulfuric acid solution and maintained at room temperature for 100 hours while stirring, an elution amount of Pt is 0.625 mg or less per gram of the fuel cell catalyst.

In the fuel cell catalyst of the present invention, Pt alloy particles are used as catalyst particles. By using Pt alloy particles as the catalyst particles, the activity of the fuel cell catalyst can be increased compared to the case of using non-alloyed Pt particles.

The fuel cell catalyst of the present invention has 0.65 mmol/g or more of hydrophilic groups. When the fuel cell catalyst has a hydrophilic group amount of 0.65 mmol/g or more, appropriate hydrophilicity is imparted to the fuel cell catalyst, whereby low-humidity catalyst performance is improved.

The elution amount of Pt when 0.5 g of the fuel cell catalyst of the present invention is immersed in 30 mL of a 0.5 mol/L sulfuric acid solution and maintained at room temperature for 100 hours while stirring is 0.625 mg or less per gram of the fuel cell catalyst. In the fuel cell catalyst of the present invention, when the elution amount of Pt under the conditions described above is 0.625 mg or less per gram of the fuel cell catalyst, the elution of Pt into the solvent used for electrode preparation is suppressed, whereby catalyst activity in the obtained electrode is secured.

The fuel cell catalyst of the present invention achieves the intended object of the present invention by the mechanism of action as described above.

According to technical common knowledge in the industry, it has been considered that if the amount of hydrophilic group in the fuel cell catalyst is increased, though the low-humidity catalyst performance may be advantageously improved, the expected catalyst performance could not be obtained due to an increase in the Pt elution amount during electrode production.

However, in the fuel cell catalyst of the present invention, both a high hydrophilic group amount and a low Pt elution amount are achieved. This is believed to be because the fuel cell catalyst of the present invention is produced via impartment of hydrophilic groups followed by a treatment step with a reducing agent. Though the reason why the Pt elution amount is reduced by carrying out this reducing agent treatment step is not clear, the present inventors presume as follows.

Specifically, it is considered that the Pt eluted from the fuel cell catalyst during electrode production is contained in ultrafine catalyst particles having extremely small particle diameters. It is presumed that these ultrafine catalyst particles move onto the carbon powder carrier in the reducing agent treatment step, are taken in by other catalyst particles having an appropriate particle size, and are no longer eluted. However, the present invention is not bound by any particular theory.

<Carbon Powder Carrier>

The carbon powder carrier of the fuel cell catalyst of the present invention may be, for example, carbon black, graphite, carbon fiber, activated carbon, amorphous carbon, or a nanocarbon material. Nanocarbon materials include carbon nanotubes, graphene, and fullerenes.

In particular, carbon black may be used as the carbon powder carrier in the fuel cell catalyst of the present invention. The carbon black is not particularly limited, and any of Ketjen black, acetylene black, oil furnace black, and gas black may be used.

The specific surface area of the carbon powder carrier, as a BET specific surface area as measured by nitrogen gas adsorption, is preferably 50 m$^2$/g or more and 1,500 m$^2$/g or less, more preferably 200 m$^2$/g or more and 1,000 m$^2$/g or less, and further preferably 500 m$^2$/g or more and 1,000 m$^2$/g or less. A carbon powder carrier having a specific surface area of 50 m$^2$/g or more has the advantage of being able to carry catalyst particles in a highly dispersed manner. Conversely, a carbon powder carrier having a specific surface area of 1,500 m$^2$/g or less has an appropriate amount of micropores and can increase the transport efficiency of oxygen and protons in the reaction in the fuel cell electrode, whereby catalyst performance can be increased.

The carbon powder carrier of the present invention has hydrophilic groups on the surface thereof. This will be described later.

<Catalyst Particles>

The catalyst particles are carried on the carbon powder carrier.

The catalyst particles of the fuel cell catalyst of the present invention are Pt alloy particles. Since the catalyst particles are Pt alloy particles, the fuel cell catalyst of the present invention has high activity.

The Pt alloy particles may be alloy particles containing:

Pt, and one or more metals selected from the group consisting of Ti, Cr, Mn, Fe, Co, Ni, Cu, Ga, Zr, Hf, Ru, Ir, Pd, Os, and Rh. Such a Pt alloy has the advantage of having a high catalyst activity for oxygen reduction.

The Pt alloy particles may typically be a Pt—Fe alloy, a Pt—Co alloy, or a Pt—Ni alloy.

The ratio of Pt atoms in the Pt alloy particles, as a percentage of the number of mols of Pt atoms relative to the total number of mols of metal atoms in the Pt alloy particles, may be 50 mol % or more, 60 mol % or more, 70 mol % or more, 75 mol % or more, 80 mol % or more, or 85 mol % or more, and may be 99 mol % or less, 95 mol % or less, 90 mol % or less, 85 mol % or less, 80 mol % or less, or 75 mol % or less. Pt alloy particles having a Pt atom ratio of 50 mol % or more have an advantage of suppressing reduction in fuel cell performance due to elution of the base metals. Pt alloy particles having a Pt atom ratio of 99 mol % or less can enjoy the advantage of introducing another metal into Pt, i.e., the advantage of increased catalytic activity for oxygen reduction.

The average particle size of the catalyst particles is preferably 2 nm or more and 10 nm or less, more preferably 2 nm or more and 7 nm or less, and further preferably 3 nm or more and 5 nm or less. When the average particle size is 2 nm or more, aggregation of the catalyst particles is suppressed in use of the fuel cell catalyst, and the high catalyst activity desired in the present invention is maintained for a long period of time. Conversely, when the average particle size of the catalyst particles is 10 nm or less, the specific surface area of the catalyst particles is increased, whereby the number of catalyst active points exposed on the surface of the catalyst particles increases, increasing catalyst activity.

The average particle size of the catalyst particles described above is the average particle size obtained from an XRD crystallite size distribution.

The carrying amount of the catalyst particles in the fuel cell catalyst of the present invention, as a ratio of the mass of the catalyst particles to the total mass of the fuel cell catalyst, may be 10% by mass or more, 15% by mass or more, 20% by mass or more, 25% by mass or more, or 30% by mass or more, and may be 60% by mass or less, 55% by mass or less, 50% by mass or less, 45% by mass or less, 40% by mass or less, 35% by mass or less, or 30% by mass or less. When the carrying amount of the catalyst particles is 10% by mass or more, excellent catalytic activity is exhibited. When the carrying amount of the catalyst particles is 60% by mass or less, a significant area of the carbon powder carrier having hydrophilic groups is exposed on the surface of the catalyst, whereby the hydrophilicity of the fuel cell catalyst is secured, which improves catalyst activity, particularly at low humidity.

<Optional Components>

As described above, the fuel cell catalyst of the present invention includes a carbon powder carrier and catalyst particles carried on the carbon powder carrier. However, the fuel cell catalyst of the present invention may contain optional components other than the carbon powder carrier and the catalyst particles.

<Hydrophilic Group>

The fuel cell catalyst of the present invention has 0.65 mmol/g or more of hydrophilic groups. When the fuel cell catalyst has a hydrophilic group amount of 0.65 mmol/g or more, the fuel cell catalyst is imparted with appropriate hydrophilicity, whereby low-humidity catalyst performance is improved. Conversely, in order to ensure the chemical stability of the fuel cell catalyst and maintain the catalyst activity for a long period of time, the hydrophilic group amount of the fuel cell catalyst may be 1.20 mmol/g or less.

The hydrophilic group amount of the fuel cell catalyst may be 0.67 mmol/g or more, 0.70 mmol/g or more, 0.72 mmol/g or more, 0.75 mmol/g or more, 0.77 mmol/g or more, or 0.80 mmol/g or more, and may be 1.10 mmol/g or less, 1.00 mmol/g or less, 0.95 mmol/g or less, 0.90 mmol/g or less, or 0.85 mmol/g or less.

The hydrophilic groups included in the fuel cell catalyst of the present invention may be acidic groups. The hydrophilic groups, which are acidic groups, can be quantified by, for example, a titration method.

The hydrophilic groups of the fuel cell catalyst of the present invention may be, for example, on the exposed surface (the portion of the carbon powder carrier surface on which catalyst particles are not carried) of the carbon powder carrier, the surface of the catalyst particles, or both. However, from the viewpoint of ensuring catalyst activity while increasing the hydrophilicity of the fuel cell catalyst of the present invention, it is presumed that the hydrophilic groups may be present on the exposed surface of the carbon powder carrier and are preferably absent on the surface of the catalyst particles.

<Elution Amount of Pt>

The elution amount of Pt when 0.5 g of the fuel cell catalyst of the present is immersed in 30 mL of a 0.5 mol/L sulfuric acid solution and maintained at room temperature for 100 hours while stirring is 0.625 mg or less per gram of the fuel cell catalyst. By setting the elution amount of Pt of the fuel cell catalyst of the present invention under the above conditions to 0.625 mg or less per gram of the fuel cell catalyst, the elution of Pt into the solvent used in the production of the electrode is suppressed, whereby catalyst activity in the resulting electrode is secured.

The elution amount of Pt under the above conditions, per gram of the fuel cell catalyst, may be 0.500 mg or less, 0.400 mg or less, 0.375 mg or less, 0.300 mg or less, 0.250 mg or less, 0.200 mg or less, or 0.125 mg or less, and may be 0.000 mg.

Specifically, the elution amount of Pt is measured by the procedure shown in the Examples, which are described later.

<<Fuel Cell Catalyst Production Method>>

The fuel cell catalyst of the present invention may be produced by the method comprising the following steps:

carrying the catalyst particles on a carbon powder carrier to prepare a catalyst particle-carrying carbon powder (carrying step);

contacting the catalyst particle-carrying carbon powder with an oxidizing agent to impart hydrophilic groups to the catalyst particle-carrying carbon powder to prepare a fuel cell catalyst precursor (hydrophilic group imparting step); and contacting the fuel cell catalyst precursor with a reducing agent to prepare a fuel cell catalyst (reducing step).

Each step of the method for the production of the fuel cell catalyst of the present invention will be described in order below.

(Carrying Step)

In the carrying step, the catalyst particles are carried on the carbon powder carrier.

The carbon powder carrier to be used may be appropriately selected and used in accordance with the carbon powder carrier of the desired fuel cell catalyst. The carbon powder carrier may be selected from, for example, carbon black, graphite, carbon fiber, activated carbon, amorphous carbon, and nanocarbon materials.

The catalyst particles, which are Pt alloy particles, can be carried on the surface of the carbon powder carrier by, for example, any of the following methods.

(1) Method of sequentially reducing and carrying Pt and an alloy metal (Method 1):

reducing a Pt precursor in a suitable solvent in the presence of a carbon powder carrier to obtain a Pt-carrying carbon powder, in which Pt particles are carried on the carbon powder carrier;

reducing an alloy metal precursor in the presence of the Pt-carrying carbon powder in a suitable solvent to obtain a Pt-alloy metal-carrying carbon powder, in which the alloy metal particles are carried on the Pt-carrying carbon powder; and heating the Pt-alloy metal-carrying carbon powder to alloy the Pt and the alloy metal and thereby obtain a catalyst particle-carrying carbon powder, in which the Pt alloy particles are carried on the carbon powder carrier.

(2) Another method of sequentially reducing and carrying Pt and an alloy metal (Method 2):

reducing a Pt precursor in a suitable solvent in the presence of a carbon powder carrier to obtain a Pt-carrying carbon powder, in which Pt particles are carried on the carbon powder carrier;

contacting an alloy metal precursor with a neutralizing agent in a suitable solvent in the presence of the Pt-carrying carbon powder to obtain a Pt-high-valence alloy metal-carrying carbon powder, in which an alloy metal having a high valence is carried on the Pt-carrying carbon powder; and heating the Pt-high-valence alloy metal-carrying carbon powder to reduce the high-valence alloy metal, alloy the Pt and the alloy metal, and thereby obtain a catalyst particle-carrying carbon powder, in which the Pt alloy particles are carried on the carbon powder carrier.

(3) Method of simultaneously reducing and carrying Pt and an alloy metal (Method 3):

reducing a Pt precursor and an alloy metal precursor in a suitable solvent in the presence of a carbon powder carrier to obtain a Pt-alloy metal-carrying carbon powder, in which Pt particles and alloy metal particles are carried on the carbon powder carrier; and heating the Pt-alloy metal-carrying carbon powder to alloy the Pt and the alloy metal and thereby obtain a catalyst particle-carrying carbon powder, in which the Pt alloy particles are carried on the carbon powder carrier.

(4) Another method of simultaneously reducing and carrying Pt and an alloy metal (Method 4):

contacting a Pt precursor and an alloy metal precursor with a neutralizing agent in a suitable solvent in the presence of a carbon powder carrier to obtain a high-valence Pt-high-valence alloy metal-carrying carbon powder, in which high-valence Pt and a high-valence alloy metal are carried on the carbon powder carrier; and heating the high-valence Pt-high-valence alloy metal-carrying carbon powder to reduce the high-valence Pt and the high-valence alloy metal, alloy the Pt and the alloy metal, and thereby obtain a catalyst particle-carrying carbon powder, in which the Pt alloy particles are carried on the carbon powder carrier.

As used herein, "alloy metal" means a metal other than Pt in a Pt alloy constituting the catalyst particles. The "high valence" Pt and alloy metal mean that these metal atoms have a valence of 1 or higher.

Methods 1 to 4 for carrying out the carrying step will be described below in order.

(1) Method of Sequentially Reducing and Carrying Pt and an Alloy Metal (Method 1)

In method 1, first, a Pt precursor is reduced in a suitable solvent in the presence of a carbon powder carrier to obtain a Pt-carrying carbon powder.

The Pt precursor may be appropriately selected from solvent-soluble Pt compounds. As the Pt precursor, for example, $PtCl_2$, $PtCl_4$, $PtBr_2$, PtS, $Pt(CN)_2$, or $Pt(NO_2)_2(NH_3)_2$ (dinitrodiammineplatinum) may be appropriately selected.

The solvent may be selected from solvents which are capable of dissolving the Pt precursor to be used. For example, in the case of $PtCl_2$ as the Pt precursor, hydrochloric acid may be used, in the case of $PtBr_2$, aqueous hydrobromic acid may be used, in the case of dinitrodiammineplatinum, aqueous nitric acid may be used, and in the case of $PtCl_4$, PtS, or $Pt(CN)_2$, water may be used.

Reduction of the Pt precursor may be carried out using a suitable reducing agent. The reducing agent may be, for example, an alcohol, carboxylic acid, aldehyde, sodium borohydride, or hydrazine. Examples of the alcohol include ethanol, examples of the carboxylic acid include acetic acid, and examples of the aldehyde include acetaldehyde. Reduction may be carried out in an inert atmosphere at a temperature of 60° C. or higher and 100° C. or lower for 0.5 hours or longer and 8 hours or shorter.

A Pt-carrying carbon powder in which Pt particles are carried on a carbon powder carrier is obtained in this manner.

The alloy metal precursor is next reduced in a suitable solvent in the presence of the obtained Pt-carrying carbon powder to obtain a Pt-alloy metal-carrying carbon powder.

The alloy metal precursor may be appropriately selected in accordance with the type of alloy metal in the desired fuel cell catalyst.

The alloy metal precursor may be appropriately selected from solvent-soluble compounds containing the desired alloy metal. For example, hydroxides, chlorides, sulfides, nitrates, sulfates, or acetates of the desired alloy metal may be used.

The solvent may be selected from solvents which are capable of dissolving the alloy metal precursor to be used. The solvent can be, for example, water.

Reduction of the alloy metal precursor may be carried out using a suitable reducing agent.

The reducing agent may be, for example, an alcohol, carboxylic acid, aldehyde, sodium borohydride, or hydrazine. Examples of the alcohol include ethanol and ethylene glycol, examples of the carboxylic acid include acetic acid, and examples of the aldehyde include acetaldehyde.

Reduction may be carried at a temperature of room temperature or higher and 100° C. or lower for 0.5 hours or longer and 40 hours or shorter.

A Pt alloy metal-carrying carbon powder, in which the alloy metal is carried on the Pt-carrying carbon powder is obtained in this manner.

Subsequently, by heating the obtained Pt alloy metal-carrying carbon powder to alloy the Pt and the alloy metal, a Pt alloy particle-carrying carbon powder (catalyst particle-carrying carbon powder) is obtained. Heating may be carried out under conditions of a maximum temperature of 600° C. or higher and 1,200° C. or lower in an inert atmosphere. The time for which the highest temperature is maintained may be 0 hours or more and 10 hours or less.

As described above, a catalyst particle-carrying carbon powder, in which the Pt alloy particles are carried on a carbon powder carrier, is obtained.

(2) Another Method of Sequentially Reducing and Carrying Pt and an Alloy Metal (Method 2):

In method 2, a Pt precursor is reduced in a suitable solvent in the presence of a carbon powder carrier to obtain a Pt-carrying carbon powder, in which Pt particles are carried on the carbon powder carrier. This step may be carried out in the same manner as in Method 1.

The alloy metal precursor is then contacted with a neutralizing agent in the presence of the Pt-carrying carbon powder in a suitable solvent to obtain a Pt-high-valence alloy metal-carrying carbon powder, in which an alloy metal having a high valence is carried on the Pt-carrying carbon powder.

The alloy metal precursor used herein may be appropriately selected from those exemplified as the alloy metal precursor in the description of Method 1.

The neutralizing agent may be, for example, a hydroxide, carbonate, phosphate, borate, or ammonia. Examples of the hydroxide include sodium hydroxide, examples of the carbonate include sodium carbonate, examples of the phosphate include sodium phosphate, and examples of the borate include sodium borate.

The carrying of the alloy metal having a high valence using the neutralizing agent may be carried out at a temperature of room temperature or higher and 100° C. or lower for a period of 0.5 hours or longer and 40 hours or shorter.

A Pt-high-valence alloy metal-carrying carbon powder, in which the alloy metal having a high valence is carried on the Pt-carrying carbon powder, is obtained in this manner.

Subsequently, the obtained Pt-high-valence alloy metal-carrying carbon powder is heated to reduce the high-valence alloy metal and to alloy Pt and the alloy metal, whereby a Pt alloy particle-carrying carbon powder (catalyst particle-carrying carbon powder) is obtained. Heating may be carried out under conditions of a maximum temperature of 600° C. or higher and 1,200° C. or lower in an inert atmosphere. The time for which the highest temperature is maintained may be 0 hours or more and 10 hours or less.

The carbon in the carbon powder carrier is considered to act as a reducing agent in the reduction of the high-valence alloy metal by this heating.

A catalyst particle-carrying carbon powder in which Pt alloy particles are carried on a carbon powder carrier is obtained in this manner.

(3) Method of Simultaneously Reducing and Carrying Pt and an Alloy Metal (Method 3)

In method 3, first, a Pt precursor and an alloy metal precursor are reduced in a suitable solvent in the presence of a carbon powder carrier to obtain a Pt-alloy metal-carrying carbon powder.

The Pt precursor and the alloy metal precursor used may be appropriately selected from those exemplified in the description of Method 1 above, depending on the configuration of the desired fuel cell catalyst.

Reduction of the Pt precursor and the alloy metal precursor may be carried out using a suitable reducing agent.

The reducing agent may be, for example, an alcohol, carboxylic acid, aldehyde, sodium borohydride, or hydrazine. Examples of the alcohol include ethanol and ethylene glycol, examples of the carboxylic acid include acetic acid, and examples of the aldehyde include acetaldehyde.

Reduction may be carried out at a temperature of room temperature or higher and 100° C. or lower for 0.5 hours or longer and 40 hours or shorter.

A Pt alloy metal-carrying carbon powder in which Pt and the alloy metal are carried on the carbon powder is obtained in this manner. The obtained Pt alloy metal-carrying carbon powder is heated to alloy the Pt and the alloy metal and thereby obtain a Pt alloy particle-carrying carbon powder (catalyst particle-carrying carbon powder). To the heating conditions, the description of the heating of Method (1) may be applied as-is.

A catalyst particle-carrying carbon powder in which Pt alloy particles are carried on a carbon powder carrier can also be obtained by the Method (3) described above.

(4) Another Method of Simultaneously Reducing and Carrying Pt and an Alloy Metal (Method 4):

In method 4, first, a Pt precursor and an alloy metal precursor are brought into contact with a neutralizing agent in a suitable solvent in the presence of a carbon powder carrier to obtain a high-valence Pt-high-valence alloy metal-carrying carbon powder in which high-valence Pt and a high-valence alloy metal are carried on a carbon powder carrier is obtained.

The Pt precursor and the alloy metal precursor used may be appropriately selected from those exemplified in the description of Method 1 above, depending on the configuration of the desired fuel cell catalyst.

The neutralizing agent may be, for example, a hydroxide, carbonate, phosphate, borate, or ammonia. Examples of the hydroxide include sodium hydroxide, examples of the carbonate include sodium carbonate, examples of the phosphate include sodium phosphate, and examples of the borate include sodium borate.

The carrying of Pt having a high valence and an alloy metal having a high valence using the neutralizing agent may be carried out at a temperature of room temperature or higher and 100° C. or lower for 0.5 hours or longer and 40 hours or shorter.

A high-valence Pt-high-valence alloy metal-carrying carbon powder in which Pt having a high valence and an alloy metal having a high valence are carried on the carbon powder is obtained in this manner. By heating the obtained high-valence Pt-high-valence alloy metal-carrying carbon powder to reduce the high-valence Pt and the high-valence alloy metal and to alloy the Pt and the alloy metal, a Pt alloy particle-carrying carbon powder (catalyst particle-carrying carbon powder) is obtained. To the heating conditions, the description of the heating of Method (1) may be applied as-is.

The carbon in the carbon powder carrier is considered to act as a reducing agent in the reduction of the high-valence Pt and the high-valence alloy metal by this heating.

A catalyst particle-carrying carbon powder in which Pt alloy particles are carried on the carbon powder carrier can also be obtained by the Method (4) described above.

(Hydrophilic Group Imparting Step)

Next, in the hydrophilic group imparting step, the obtained catalyst particle-carrying carbon powder is brought into contact with an oxidizing agent to impart the catalyst particle-carrying carbon powder with hydrophilic groups to prepare a fuel cell catalyst precursor.

This step may be carried out in a suitable solvent. The solvent may be, for example, water having a suitably adjusted pH.

The oxidizing agent used for imparting the hydrophilic groups may be selected from, for example, sulfuric acid, nitric acid, phosphorous acid, potassium permanganate, hydrogen peroxide, chloric acid, and chromic acid.

The hydrophilic group imparting step may involve heat treatment during or after contact between the catalyst particle-carrying carbon powder and the oxidizing agent. The conditions for this heat treatment may be, for example, at a temperature of 60° C. or higher and 110° C. or lower for a period of 6 hours or longer and 100 hours or shorter.

As a result of this hydrophilic group imparting step, a fuel cell catalyst precursor in which the catalyst particle-carrying carbon powder is imparted with hydrophilic groups is obtained. In the hydrophilic group imparting step, the catalyst particles may also conceivably be imparted with hydrophilic groups. However, it is believed that the hydrophilic groups imparted to the catalyst particles are removed in the subsequent reduction step.

(Reduction Step)

In the reduction step, the fuel cell catalyst precursor is brought into contact with a reducing agent to prepare the fuel cell catalyst. In this reduction step, it is desirable to adjust the degree of reduction so that the hydrophilic groups on the catalyst particles are removed by reduction but the hydrophilic groups on the carbon powder carrier are not removed.

Thus, the reducing agent used in the reduction step may be a relatively weak reducing agent, and may be selected from, for example, alcohols such as ethanol, carboxylic acids such as acetic acid, and aldehydes such as acetaldehyde.

This step may be carried out in a suitable solvent. The solvent may be, for example, water having a suitably adjusted pH.

The reduction step may be accompanied by heat treatment during or after contact between the fuel cell catalyst precursor and the reducing agent. The conditions for this heat treatment may be, for example, at a temperature of room temperature or higher and 100° C. or lower for a period of time of 0.5 hours or longer and 48 hours or shorter.

The fuel cell catalyst of the present invention may be prepared by the method described above or by a method in which appropriate modifications are made to the method described above by a person skilled in the art.

<<Electrode>>

In another aspect, the present invention relates to a fuel cell electrode comprising the fuel cell catalyst of the present invention.

The electrode comprises the fuel cell catalyst of the present invention, and preferably further comprises an ionomer.

As the ionomer, for example, commercially available products such as Nafion™ and Aquivion® may be used.

The catalyst layer comprises the fuel cell catalyst of the present invention and preferably further ionomer, but may further comprise optional components such as a binder.

When the electrode of the fuel cell of the present invention is used as the cathode of the fuel cell, the intended object of the present invention can be achieved, which is preferable.

<<Fuel Cell>>

In yet another aspect, the present invention relates to a fuel cell comprising the electrode of the fuel cell described above.

The fuel cell of the present invention may be a solid polymer fuel cell.

The solid fuel cell may have, for example, a structure in which a cathode, a solid polymer electrolyte membrane, and an anode are laminated in this order, and the cathode may be an electrode comprising the fuel cell catalyst of the present invention.

The solid polymer electrolyte membrane and the anode of this solid fuel cell may be a known solid polymer electrolyte membrane and anode, respectively.

The solid fuel cell of the present invention may have air or oxygen channels on the cathode side and fuel channels on the anode side.

The solid fuel cell of the present invention may be produced by a known method, except that the electrode comprising the fuel cell catalyst of the present invention is used as the cathode.

EXAMPLES

Example 1

(1) Carrying Step (Preparation of PtCo Alloy-Carrying Carbon Particles)

100 parts by mass of a commercially available carbon powder (manufactured by Lion Specialty Chemicals Co., Ltd., carbon black, product name "Ketjen Black") was dispersed in a 0.1 mol/L nitric acid aqueous solution, and a dinitrodiammineplatinum nitric acid solution equivalent to 42.9 parts by mass (219.9 mmol) in terms of Pt was added thereto. 1,200 parts by mass of ethanol as a reducing agent was then added thereto, stirred for 15 minutes, and then heated and stirred at 90° C. for 2 hours to precipitate Pt particles on the carbon powder, resulting in a Pt-carrying carbon particles. The solid content was collected by filtration and dried to recover the Pt-carrying carbon particles. The Pt content of the Pt-carrying carbon particles was 30% by mass.

142.9 parts by mass of the obtained Pt-carrying carbon particles were dispersed in pure water, and an aqueous cobalt nitrate solution was added thereto so that the Pt/Co ratio in the ultimate catalyst particles was 7:1 (molar ratio). Thereafter, 4 parts by mass of sodium borohydride as a reducing agent was added thereto, and the mixture was stirred overnight to precipitate Co particles on the Pt-carrying carbon particles. The solid content was collected by filtration and dried for 15 hours in an air drier adjusted to 80° C. to obtain PtCo-carrying carbon particles.

The obtained PtCo-carrying carbon particles were heat-treated at 900° C. for 1 hour in an argon atmosphere to obtain PtCo alloy-carrying carbon particles.

(2) Hydrophilic Group Imparting Step (Hydrophilization Treatment of PtCo Alloy-Carrying Carbon Particles)

The PtCo alloy-carrying carbon particles obtained as described above were added to a 0.5 mol/L nitric acid aqueous solution and stirred at 90° C. for 21 hours to carry out hydrophilic treatment. Thereafter, the solid content was collected by filtration and dried for 15 hours in an air drier adjusted to 80° C. to obtain hydrophilized PtCo alloy-carrying carbon particles (fuel cell catalyst precursor).

(3) Reduction Step (Reduction Treatment of Hydrophilized PtCo Alloy-Carrying Carbon Particles)

The hydrophilized PtCo alloy-carrying carbon particles obtained as described above were added to an aqueous solution containing 0.1 mol/L of nitric acid and 10% by mass of ethanol, and heated and stirred at the boiling point (91 to 92° C.) for 2 hours to carry out the reduction treatment. Thereafter, the solid content was collected by filtration and dried for 15 hours in an air dryer adjusted to 80° C. to obtain the catalyst particles of Example 1. In these catalyst particles, catalyst particles composed of PtCo alloy particles were carried on carbon black. The Pt:Co molar ratio of the catalyst particles was 7:1.

Example 2

The catalyst particles of Example 2 were obtained in the same manner as in Example 1 except that in the "(1) Carrying step", the amount of the cobalt nitrate aqueous solution used was adjusted so that the final Pt/Co ratio of the catalyst particles was 3:1 (molar ratio).

Comparative Examples 1 and 2

Hydrophilized PtCo alloy-carrying carbon particles obtained in the same manner as in Examples 1 and 2 were not subjected to the "(3) Reduction step", and the hydrophilized PtCo alloy-carrying carbon particles were used as-is as the catalyst particles of Comparative Examples 1 and 2.

Comparative Example 3

The catalyst particles of Comparative Example 3 were obtained in the same manner as in Comparative Example 1, except that in the "(1) Carrying step", the cobalt nitrate aqueous solution was not added and the Co reduction treatment with sodium borohydride was not carried out. In these catalyst particles, the catalyst particles composed of the Pt particles were carried on the carbon black.

Comparative Examples 4 and 5

The catalyst particles of Comparative Examples 4 and 5 were obtained in the same manner as in Comparative Example 1, except that the conditions of the "(2) Hydrophilic group imparting step" were changed as described in Table 1.

<<Catalyst Evaluation>>

(1) Identification of Hydrophilic Groups and Quantification of Hydrophilic Group Amount Regarding the catalyst particles obtained in each Example and Comparative Example, the hydrophilic group amount of the catalyst particles was quantified by carrying out an acid-base titration analysis by the Boehm method.

(2) Measurement of Particle Size of Catalyst Particles

XRD analysis was carried out on the catalyst particles obtained in each Example and Comparative Example, and the particle size was calculated by substituting the half width of the peak appearing in the range of 20=65 to 730 into the Scherrer equation.

(3) Measurement of Pt Elution Amount 0.5 g of the catalyst particles obtained in each Example and Comparative Example were immersed in 30 mL of a 0.5 mol/L sulfuric acid solution and maintained at room temperature for 100 hours. 5 mL of the filtrate obtained by filtering the catalyst particles was then collected, transferred to a volumetric flask, and diluted to 50 mL, and the amount of Pt contained in the diluted solution was measured by inductively coupled plasma (ICP) analysis to calculate the amount of Pt elution per gram of catalyst particles.

(5) Production of Single Cell for Performance Evaluation

The catalyst particles obtained in each Example and Comparative Example and Nafion (manufactured by Sigma-Aldrich) as an ionomer were dispersed in a mixed solvent composed of ethanol and water to obtain a dispersion. This dispersion was applied to one side of a Teflon™ sheet and dried to form a catalyst layer (cathode) on the sheet and thereby obtain a cathode transfer laminate.

Using Ketjen black carrying 30% by mass of Pt in place of the catalyst particles described above, a laminate for anode transfer was obtained by forming a catalyst layer (anode) on the sheet in the same manner as the cathode.

The cathode transfer laminate and the anode transfer laminate obtained as described above were laminated with the respective catalyst layer forming surfaces facing each other via a polymer electrolyte membrane and hot pressed to transfer the cathode and anode to both sides of the polymer electrolyte membrane. After peeling off the sheets, diffusion layers were arranged on both sides of the catalyst layer bonded product, whereby a single cell for performance evaluation was produced.

(6) Evaluation of Catalyst Performance

The single cell for performance evaluation obtained in "Production of single cell for performance evaluation" was installed in a fuel cell evaluation system manufactured by Toyo Technica Corporation, and under the conditions of a cell temperature of 80° C. and a relative humidity of 50%-RH at both electrodes, the current value was changed from 0.01 $A/cm^2$ to 2.0 $A/cm^2$ and the cell voltage was measured at each current value.

At this time, the cell voltage at a current of 1.0 $A/cm^2$ was used as the low humidity performance voltage, which was used as an index of catalyst performance at low humidity. Using the current value and voltage value at this time, analysis by Tafel plot was carried out, and the value obtained by dividing the current value at a cell voltage of 0.9 V by the catalyst mass was defined as the catalyst mass activity current, which was used as an index of the catalyst mass activity.

Figure 2:
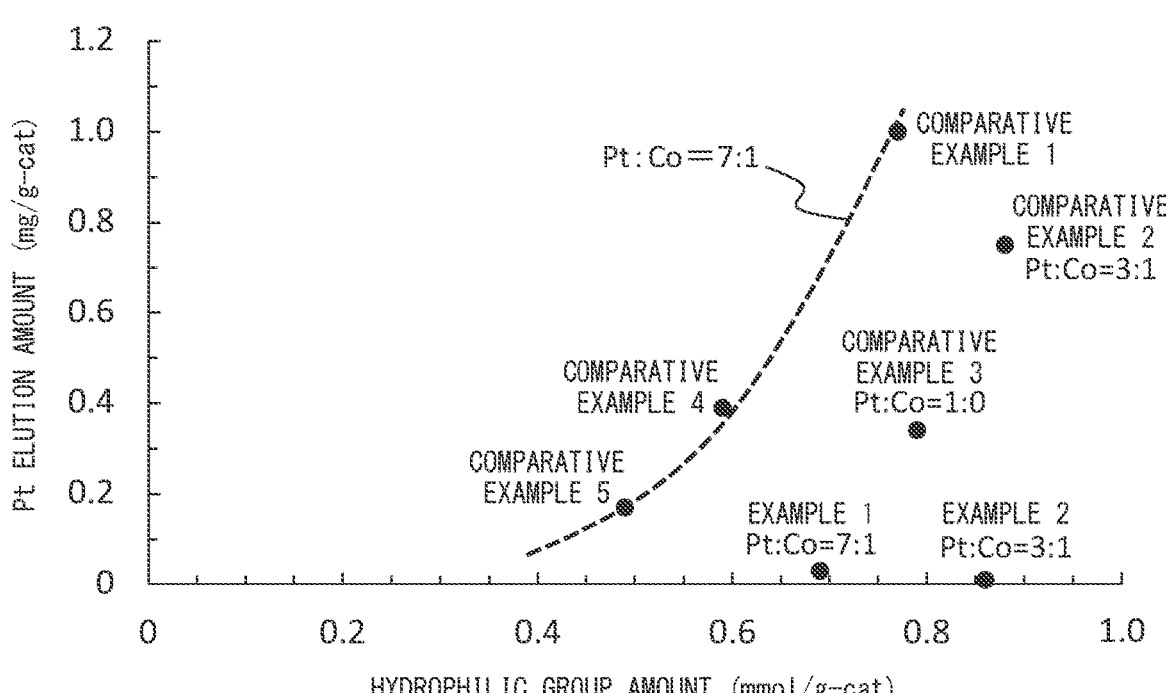
FIG. 2 is a graph showing the relationship between the hydrophilic group amount and the Pt elution amount of the catalyst particles obtained in the Examples and Comparative Examples.

The obtained results are shown in Table 1. FIG. 1 shows a graph in which the horizontal axis represents the hydrophilic group amount of the catalyst particles and the vertical axis represents the low humidity performance voltage. Furthermore, FIG. 2 shows a graph in which the horizontal axis represents the hydrophilic group amount of the catalyst particles and the vertical axis represents the Pt elution amount of the catalyst particles.

TABLE 1

| | | | | | | Evaluation results | | | | |
| --- | --- | --- | --- | --- | --- | --- | --- | --- | --- | --- |
| | Pt:Co | Hydrophilic group imparting step | | Reduction step | | Hydrophilic group amt | Catalyst particle | Pt elution amt | Low humidity performance voltage | Catalytic mass activation current |
| | (molar ratio) | Temp (° C.) | Time (h) | Temp | Time (h) | (mmol/g-cat) | size (nm) | (mg/g-cat) | (V @ 1.0 A/cm²) | (A/g-cat @ 0.9 V) |
| Ex 1 | 7:1 | 90 | 21 | Boiling point | 2 | 0.69 | 3.6 | 0.03 | 0.602 | 95 |
| Ex 2 | 3:1 | 90 | 21 | Boiling point | 2 | 0.86 | 3.5 | 0.01 | 0.628 | 94 |
| Comp Ex 1 | 7:1 | 90 | 21 | — | — | 0.77 | 3.5 | 1.00 | 0.612 | 68 |
| Comp Ex 2 | 3:1 | 90 | 21 | — | — | 0.88 | 3.6 | 0.75 | 0.620 | 77 |
| Comp Ex 3 | 1:0 | 90 | 21 | — | — | 0.79 | 3.5 | 0.34 | 0.603 | 49 |
| Comp Ex 4 | 7:1 | 90 | 6 | — | — | 0.59 | 3.5 | 0.39 | 0.338 | 97 |
| Comp Ex 5 | 7:1 | 80 | 6 | — | — | 0.49 | 3.6 | 0.17 | 0.044 | 108 |

FIG. 1 is a graph in which the horizontal axis represents the hydrophilic group amount of the catalyst particles and the vertical axis represents the low humidity performance voltage.

Referring to Table 1 and FIG. 1, it was verified that when the hydrophilic group amount of the catalyst particles was 0.65 mmol/g-cat or more, the low humidity performance voltage was high and the performance at low humidity was improved. However, there is a concern that catalyst particles exhibiting a high hydrophilic group content of 0.65 mmol/g-cat or more have a large Pt elution amount and a low catalyst mass activity.

FIG. 2 is a graph in which the horizontal axis represents the hydrophilic group amount of the catalyst particles and the vertical axis represents the Pt elution amount of the catalyst particles.

With reference to Table 1 and FIG. 2, the catalyst particles of Examples 1 and 2, which satisfy the predetermined requirements of the present invention, had a high hydrophilic group amount of 0.65 mmol/g-cat or more, and the Pt elution amount was extremely low, and high catalyst mass activity is expected.

Referring to Table 1, it was verified that the catalyst particles of Examples 1 and 2 had improved performance at low humidity and high catalyst mass activity.

From the foregoing, it was verified that when the catalyst particles of Examples 1 and 2, which satisfy the requirements of the present invention, are used, both performance at low humidity and catalyst mass activity are achieved.

The invention claimed is:

1. A fuel cell catalyst, comprising a carbon powder carrier, and catalyst particles carried on the carbon powder carrier, wherein the catalyst particles are Pt alloy particles, the fuel cell catalyst has 0.65 mmol/g or more of hydrophilic groups, and when 0.5 g of the fuel cell catalyst is immersed in 30 mL of a 0.5 mol/L sulfuric acid solution and maintained at room temperature for 100 hours while stirring, an elution amount of Pt is 0.625 mg or less per gram of the fuel cell catalyst.

2. The fuel cell catalyst according to claim 1, wherein the hydrophilic groups are acidic groups.

3. The fuel cell catalyst according to claim 1, wherein the elution amount of Pt is 0.300 mg or less per gram of the fuel cell catalyst.

4. The fuel cell catalyst according to claim 1, wherein the Pt alloy particles are alloy particles containing:

Pt, and one or more metals selected from the group consisting of Ti, Cr, Mn, Fe, Co, Ni, Cu, Ga, Zr, Hf, Ru, Ir, Pd, Os, and Rh.

5. The fuel cell catalyst according to claim 1, wherein an average particle size of the catalyst particles is 2 nm or more and 10 nm or less.

6. An electrode of a fuel cell, comprising the fuel cell catalyst according to claim 1.

7. The electrode according to claim 6, wherein the electrode is a cathode.

8. A fuel cell, comprising the electrode according to claim 6.

9. A method for the production of a fuel cell catalyst, comprising a carbon powder carrier, and catalyst particles carried on the carbon powder carrier, wherein the catalyst particles are Pt alloy particles, the fuel cell catalyst has 0.65 mmol/g or more of hydrophilic groups, and when 0.5 g of the fuel cell catalyst is immersed in 30 mL of a 0.5 mol/L sulfuric acid solution and maintained at room temperature for 100 hours while stirring, an elution amount of Pt is 0.625 mg or less per gram of the fuel cell catalyst, and the method comprises the steps of:

carrying the catalyst particles on the carbon powder carrier to prepare a catalyst particle-carrying carbon powder;

contacting the catalyst particle-carrying carbon powder with an oxidizing agent to impart the hydrophilic groups to the catalyst particle-carrying carbon powder to prepare a fuel cell catalyst precursor; and contacting the fuel cell catalyst precursor with a reducing agent to prepare the fuel cell catalyst.

10. The method according to claim 9, wherein the oxidizing agent used in the contacting of the catalyst particle-carrying carbon powder is one or more oxidizing agents selected from the group consisting of sulfuric acid, nitric acid, phosphorous acid, potassium permanganate, hydrogen peroxide, chloric acid, and chromic acid.

11. The method according to claim 9, wherein the reducing agent used in the contacting of the fuel cell catalyst precursor is one or more reducing agents selected from the group consisting of alcohols, carboxylic acids, and aldehydes.

12. The method according to claim 9, wherein the contacting the fuel cell catalyst precursor with a reducing agent is carried out at a temperature of room temperature or higher and 100° C. or lower.

13. The method according to claim 9, wherein the contacting the fuel cell catalyst precursor with a reducing agent is carried out for a period of time of 0.5 hours or longer and 48 hours or shorter.

14. The method according to claim 9, wherein the hydrophilic groups are acidic groups.

15. The method according to claim 9, wherein the Pt alloy particles are alloy particles containing:

Pt, and one or more metals selected from the group consisting of Ti, Cr, Mn, Fe, Co, Ni, Cu, Ga, Zr, Hf, Ru, Ir, Pd, Os, and Rh.

16. The fuel cell catalyst according to claim 1, wherein the fuel cell catalyst is produced by a method comprising the steps of:

carrying the catalyst particles on the carbon powder carrier to prepare a catalyst particle-carrying carbon powder;

contacting the catalyst particle-carrying carbon powder with an oxidizing agent to impart the hydrophilic groups to the catalyst particle-carrying carbon powder to prepare a fuel cell catalyst precursor; and contacting the fuel cell catalyst precursor with a reducing agent to prepare the fuel cell catalyst.

* * * * *